US012548494B2

(12) United States Patent
Chang et al.

(10) Patent No.: US 12,548,494 B2
(45) Date of Patent: Feb. 10, 2026

(54) DISPLAY DEVICE AND METHOD FOR DISPLAYING IMAGE USING DISPLAY DEVICE WITH BRIGHTNESS OPTIMIZATION

(71) Applicants: InnoLux Corporation, Miao-Li County (TW); CARUX TECHNOLOGY PTE. LTD., Aperia (SG)

(72) Inventors: Yi-Cheng Chang, Tainan (TW); Cheng-Wu Lin, Miao-Li County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/024,675

(22) Filed: Jan. 16, 2025

(65) Prior Publication Data

US 2025/0273125 A1 Aug. 28, 2025

(30) Foreign Application Priority Data

Feb. 27, 2024 (CN) ......................... 202410214120.5

(51) Int. Cl.
*G09G 3/20* (2006.01)
*G09G 3/34* (2006.01)

(52) U.S. Cl.
CPC ......... *G09G 3/2096* (2013.01); *G09G 3/3406* (2013.01); *G09G 2320/0233* (2013.01); *G09G 2320/0626* (2013.01)

(58) Field of Classification Search
CPC .................................................... G09G 3/3406
See application file for complete search history.

(56) References Cited

U.S. PATENT DOCUMENTS

| | | | | |
|---|---|---|---|---|
| 10,607,569 | B2 | 3/2020 | Atkins | |
| 2017/0221450 | A1* | 8/2017 | Kim | G06F 1/1637 |
| 2022/0206733 | A1 | 6/2022 | Hsiao | |
| 2022/0244585 | A1 | 8/2022 | Hsieh | |
| 2023/0040240 | A1 | 2/2023 | Hsiao | |
| 2023/0354521 | A1 | 11/2023 | Nien | |
| 2023/0365103 | A1 | 11/2023 | Hsiao | |

(Continued)

FOREIGN PATENT DOCUMENTS

| | | |
|---|---|---|
| CN | 115718544 A | 2/2023 |
| CN | 115799225 A | 3/2023 |
| CN | 117912386 A | 4/2024 |

*Primary Examiner* — Gustavo Polo
(74) *Attorney, Agent, or Firm* — JCIPRNET

(57) ABSTRACT

A method for displaying an image using a display device includes the following steps. An initial image is provided. The initial image includes a plurality of frame image signals. Each of the frame image signals includes a brightness signal corresponding to the brightness. The change area between the (N−1)th frame image signal and the Nth frame image signal is analyzed, wherein the change area includes a first change area and a second change area, the brightness in the first change area changes from large to small, and the brightness in the second change area changes from small to large. The brightness of the compensation area adjacent to the second change area in the Nth frame image signal is increased. When displaying the Nth frame image, the display device receives the Nth frame image signal and the brightness signal of the compensation area adjacent to the second change area.

20 Claims, 11 Drawing Sheets

(56) References Cited

U.S. PATENT DOCUMENTS

| | | | |
|---|---|---|---|
| 2023/0373306 | A1 | 11/2023 | Chang |
| 2024/0021763 | A1 | 1/2024 | Nien |
| 2024/0038185 | A1 | 2/2024 | Nien |
| 2024/0200766 | A1 | 6/2024 | Sung |
| 2024/0367594 | A1 | 11/2024 | Huang |

* cited by examiner

DISPLAY DEVICE AND METHOD FOR DISPLAYING IMAGE USING DISPLAY DEVICE WITH BRIGHTNESS OPTIMIZATION

CROSS REFERENCE TO RELATED APPLICATIONS

This application n claims priority of China Patent Application No. 202410214120.5, filed on Feb. 27, 2024, the entirety of which is incorporated by reference herein.

BACKGROUND OF THE DISCLOSURE

Field of the Disclosure

The disclosure relates to a method for displaying an image, and in particular, it relates to a display device and a method for displaying an image using a display device that is capable of improving the quality of the displayed image.

Description of the Related Art

In a conventional display device, the halo size of the object in the image may be increased to compensate for the brightness and stability of the object. However, since the halo sizes of all objects in the image may be increased, some objects that do not need to have their halos increased may also have a halo added, which may cause the image display to have poor quality. Therefore, a new design for a circuit structure is needed to solve the problem described above.

BRIEF SUMMARY OF THE DISCLOSURE

An embodiment of the disclosure provides a method for displaying an image using a display device, which includes the following steps. An initial image is provided, wherein the initial image includes a plurality of frame image signals, and each of the frame image signals includes a brightness signal and the brightness signal corresponds to the brightness. The change area between the (N−1)th frame image signal and the Nth frame image signal is analyzed, wherein the change area includes a first change area and a second change area, the brightness in the first change area changes from large to small, and the brightness in the second change area changes from small to large. The brightness of the compensation area adjacent to the second change area in the Nth frame image signal is increased. When displaying the Nth frame image, the display device is used to receive the Nth frame image signal and the brightness signal of the compensation area adjacent to the second change area.

An embodiment of the disclosure provides a display device, which includes an image source, a timing controller, and a display. The image source is configured to provide an initial image, wherein the initial image includes a plurality of frame image signals, and each of the frame image signals includes a brightness signal and the brightness signal corresponds to the brightness. The timing controller is electrically connected to the image source and includes a processor, wherein the processor is configured to analyze the change area between the (N−1)th frame image signal and the Nth frame image signal, and generate an image command. The display is electrically connected to the timing controller, and configured to receive the image command. The change area between the (N−1)th frame image signal and the Nth frame image signal includes a first change area and a second change area, the brightness in the first change area changes from large to small, and the brightness in the second change area changes from small to large. The display is configured to increase the brightness of the compensation area adjacent to the second change area in the Nth frame image signal. When displaying the Nth frame image, the display device is configured to receive the Nth frame image signal and the brightness signal of the compensation area adjacent to the second change area.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
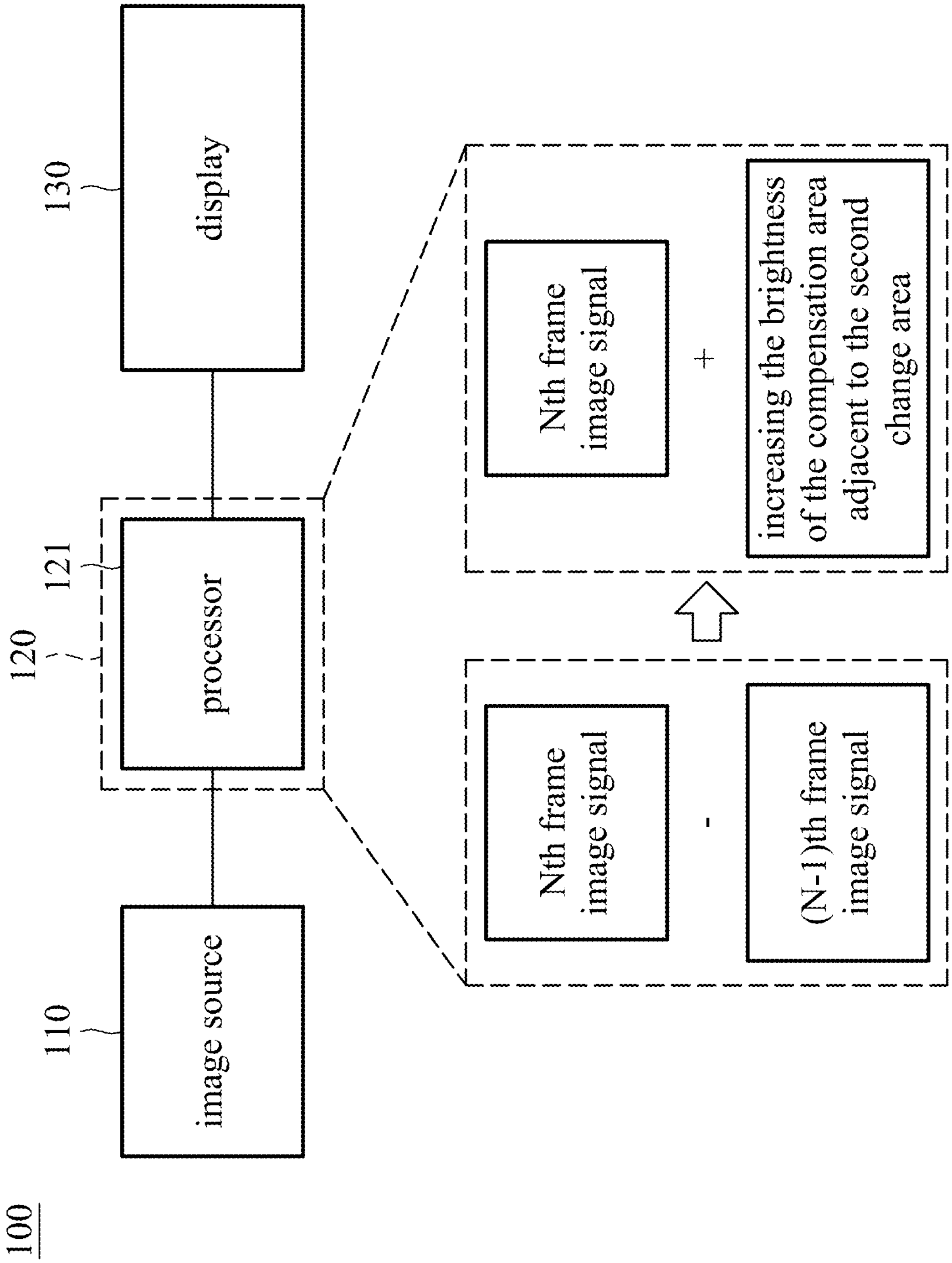
FIG. 1 is a schematic view of a display device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term "coupled" or "electrically connected" may include any direct and indirect means of electrical connection.

In the text, the terms "substantially" or "approximately" usually means within 10%, or within 5%, or within 3%, or within 2%, or within 1%, or within 0.5% of a given value or range.

The "including" mentioned in the entire specification and claims is an open term, so it should be interpreted as "including or comprising but not limited to".

Furthermore, "connected" or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device. "Electrically connected" or "coupled" described in the disclosure may refer to "directly connected" or "indirectly connected". In the case of "directly connected", the terminals of the elements on two circuits are directly connected or connected to each other through a conductive line segment. In the case of "indirectly connected", there are a switch, a diode, a capacitor, an inductor, a resistor, another suitable element, or a combination of the above elements between the terminals of the elements on the two circuits, but the disclosure is not limited thereto.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode (LED) or a photodiode (PD). The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of a display device according to an embodiment of the disclosure. Please refer to FIG. 1. The display device 100 may at least include an image source 110, a timing controller (T-CON) 120 and a display 130. The image source 110 may provide an image source, wherein the initial image may include a plurality of frame image signals, and each of the frame image signals may include a brightness signal and the brightness signal corresponds to the brightness The timing controller 120 may be electrically connected to the image source 110, and the timing controller 120 may include a processor 121. The processor 121 may be configured to analyze the change area between the (N−1)th frame image signal and the Nth frame image signal, and generate an image command. That is, the processor 121 may compare the (N−1)th frame image signal with the Nth frame image signal (for example, subtracting the (N−1)th frame image signal and the Nth frame image signal) to obtain the change area between the (N−1)th frame image signal and the Nth frame image signal (such as the moving direction of the object of the image signal), and generate the corresponding image command accordingly. In some embodiments, the processor 121 may be a central processing unit (CPU), a microprocessor, a micro control unit (MCU), but the disclosure is not limited thereto.

In some embodiments, the change area between the (N−1)th frame image signal and the Nth frame image signal may include a first change area and a second change area, wherein the brightness in the first change area changes, for example, from large to small, and the brightness in the second change area changes, for example, from small to large, but the disclosure is not limited thereto.

Figure 2C:
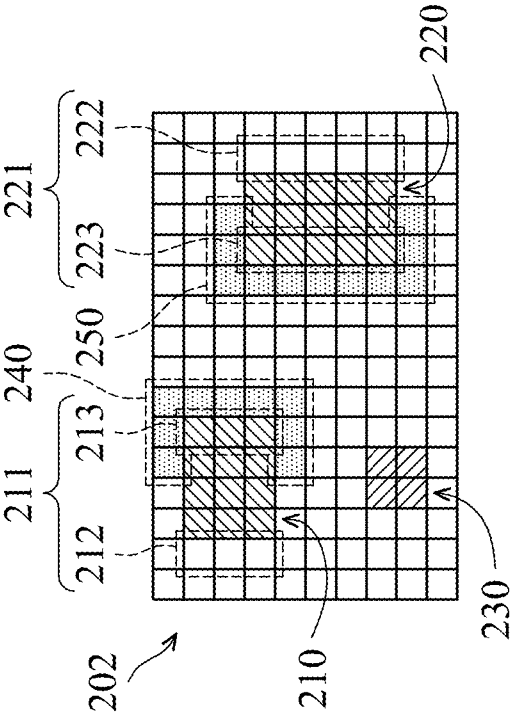
FIG. 2C is a schematic view of Nth frame image signal according to an embodiment of the disclosure.
Figure 2A:
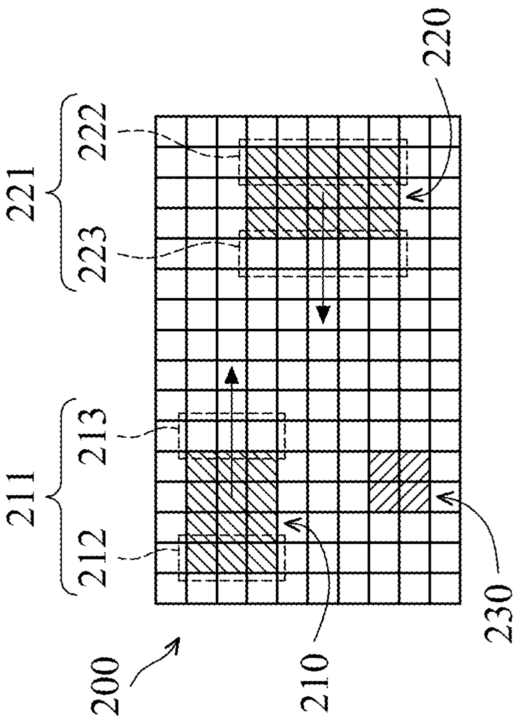
FIG. 2A is a schematic view of (N−1)th frame image signal according to an embodiment of the disclosure.
Figure 2B:
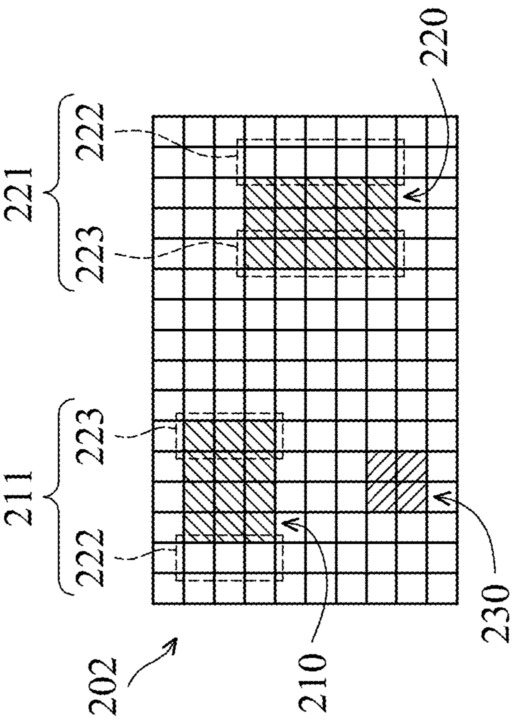
FIG. 2B is a schematic view of Nth frame image signal according to an embodiment of the disclosure.

For example, in some embodiments, as shown in FIG. 2A, FIG. 2B and FIG. 2C, the reference number "200" represents the (N−1)th frame image signal, the reference number "202" represents the Nth frame image signal, the reference number "210" and the reference number "220" represent the dynamic objects, the reference number "230" represents the static object, the reference number "211" and the reference number "221" represent the change areas, the reference number "212" and the reference number "222" represent the first change areas, the reference number "213" and the reference number "223" represent second change areas, the reference number "240" represents the compensation area adjacent to the second change area 213, and the reference number "250" represents the compensation area adjacent to the second change are 223.

From FIG. 2A and FIG. 2B, it can be seen that when the (N−1)th frame image signal 200 changes into the Nth frame image signal 202 (for example, subtracting the Nth frame image signal 202 and the (N−1)th frame image signal 200), the dynamic object 210 moves to the right, the dynamic object 220 moves to the left, and the static object 230 remains stationary.

In addition, a change area 211 corresponding to the dynamic object 210 and a change area 221 corresponding to the dynamic object 220 may be included between the (N−1)th frame image signal 200 and the Nth frame image signal 202. The change area 211 may include the first change area 212 and the second change area 213, and the change area 221 may include the first change area 222 and the second change area 223. The brightness of the first change area 212 and the first change area 222 may change from large to small (for example, from bright to dark), and the brightness of the second change area 213 and the second change area 223 may change from small to large (for example, from dark to bright).

Figure 3B:
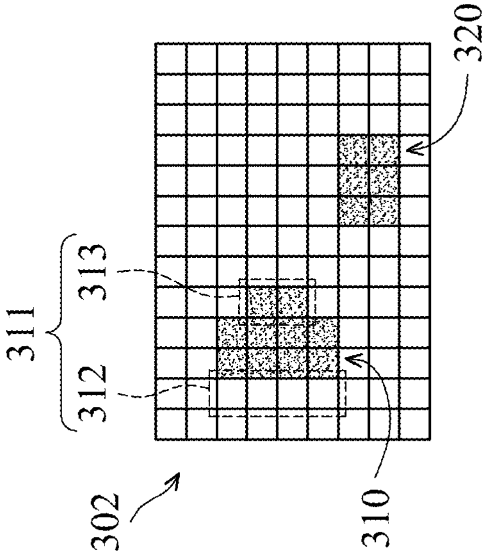
FIG. 3B is a schematic view of Nth frame image signal according to an embodiment of the disclosure.
Figure 3C:
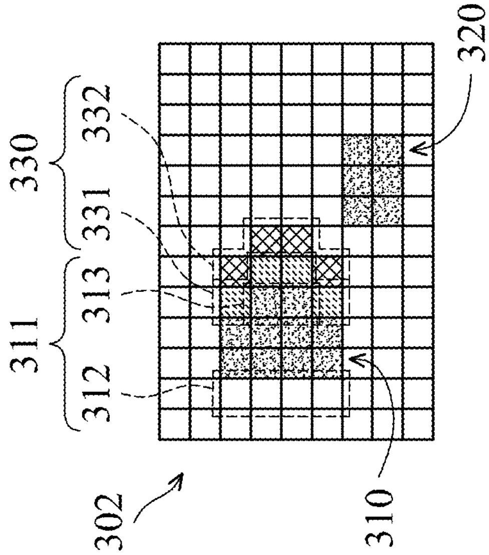
FIG. 3C is a schematic view of Nth frame image signal according to an embodiment of the disclosure.
Figure 3A:
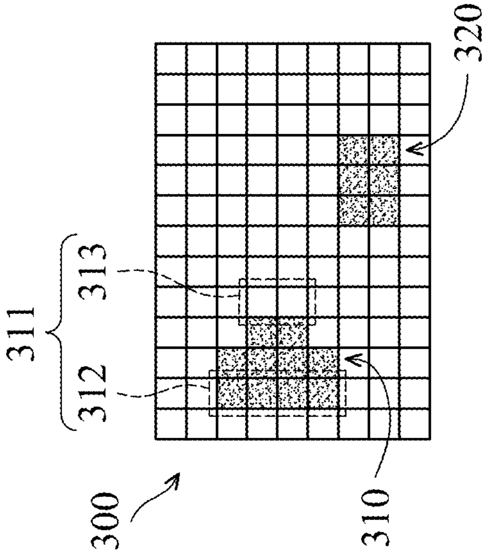
FIG. 3A is a schematic view of (N−1)th frame image signal according to an embodiment of the disclosure.

In addition, in some embodiments, as shown in FIG. 3A, FIG. 3B and FIG. 3C, the reference number "300" represents the (N−1)th frame image signal, the reference number "302" represents the Nth frame image signal, the reference number "310" represents the dynamic object, the reference number "320" represents the dynamic object, the reference number "311" represents the change area, the reference number "312" represents the first change area, the reference number "313" represents second change area, the reference number "330" represents the compensation area adjacent to the second change area 313, the reference number "331" represent the first compensation area of the compensation area 330, and the reference number "332" represents the second compensation area of the compensation area 330.

From FIG. 3A and FIG. 3B, it can be seen that when the (N−1)th frame image signal 300 changes into the Nth frame image signal 302 (for example, subtracting the Nth frame image signal 302 and the (N−1)th frame image signal 300), the dynamic object 310 moves to the right, and the static object 320 remains stationary. In addition, a change area 311 corresponding to the dynamic object 310 may be included between the (N−1)th frame image signal 300 and the Nth frame image signal 302. The change area 311 may include the first change area 312 and the second change area 313. The brightness of the first change area 312 may change from large to small (for example, from bright to dark), and the brightness of the second change area 313 may change from small to large (for example, from dark to bright).

The display 130 may be electrically connected to the timing controller 120, and the display 130 may receive the image command. The display 130 may increase the brightness of the compensation area adjacent to the second change area in the Nth frame image signal. That is, the display 130 may increase the brightness of the compensation area adjacent to the second change area in the Nth frame image signal according to the image command.

For example, in some embodiments, as shown in FIG. 2C, the display 130 may the brightness of the compensation area 240 adjacent to the second change area 213 and the brightness of the compensation area 250 adjacent to the second change area 223 in the Nth frame image signal 202. In the embodiment, the compensation area 240 may surround the second change area 213, and the compensation area 250 may surround the second change area 223.

In some embodiments, the brightness of the compensation area 240 may be equal to the brightness of the second change area 213, and the brightness of the compensation area 250 may be equal to the brightness of the second change area 223, but the disclosure is not limited thereto. For example, the brightness of the compensation area 240 is 100% of the brightness of the second change area 213, and the brightness of the compensation area 250 is 100% of the brightness of the second change area 223, but the disclosure is not limited thereto.

In some embodiments, the brightness of the compensation area 240 may be smaller than the brightness of the second change area 213, and the brightness of the compensation area 250 may be smaller than the brightness of the second change area 223, but the disclosure is not limited thereto. For example, the brightness of the compensation area 240 is 50% of the brightness of the second change area 213, and the brightness of the compensation area 250 is 50% of the brightness of the second change area 223, but the disclosure is not limited thereto.

In some embodiments, as shown in FIG. 3C, the display 130 may increase the brightness of the compensation area 330 adjacent to the second change area 313 in the Nth frame image signal 302. In the embodiment, the compensation area 330 may include a first compensation area 331 and a second compensation area 332, and the first compensation area 331 is located between the second change area 313 and the second compensation area 332.

In some embodiments, the brightness of the first compensation area 331 may be equal to the brightness of the second change area 313, and the brightness of the second compensation area 332 may be smaller than the brightness of the first compensation area 331. For example, the brightness of the first compensation area 331 is 100% of the brightness of the second change area 313, and the brightness of the second compensation area 332 is 50% of the brightness of the second change area 313, but the disclosure is not limited thereto.

In some embodiments, the brightness of the first compensation area 331 may be smaller than the brightness of the second change area 313, and the brightness of the second compensation area 332 may be smaller than the brightness of the first compensation area 331, but the disclosure is not limited thereto. For example, the brightness of the first compensation area 331 is 50% of the brightness of the second change area 313, and the brightness of the second compensation area 332 is 25% of the brightness of the second change area 313, but the disclosure is not limited thereto.

Then, when the display device 100 displays the Nth frame image, the display 130 may receive the Nth frame image signal (such as 202 or 302) and the brightness signal of the compensation area (such as 240, 250 or 330) adjacent to the second change area (such as 213, 223 or 313, so as to display the corresponding image and backlight brightness. Therefore, it may effectively increase the halo size of the dynamic object to compensate for the stability and speed of the brightness of the dynamic object, or decrease the halo size of the static object.

Figure 4:
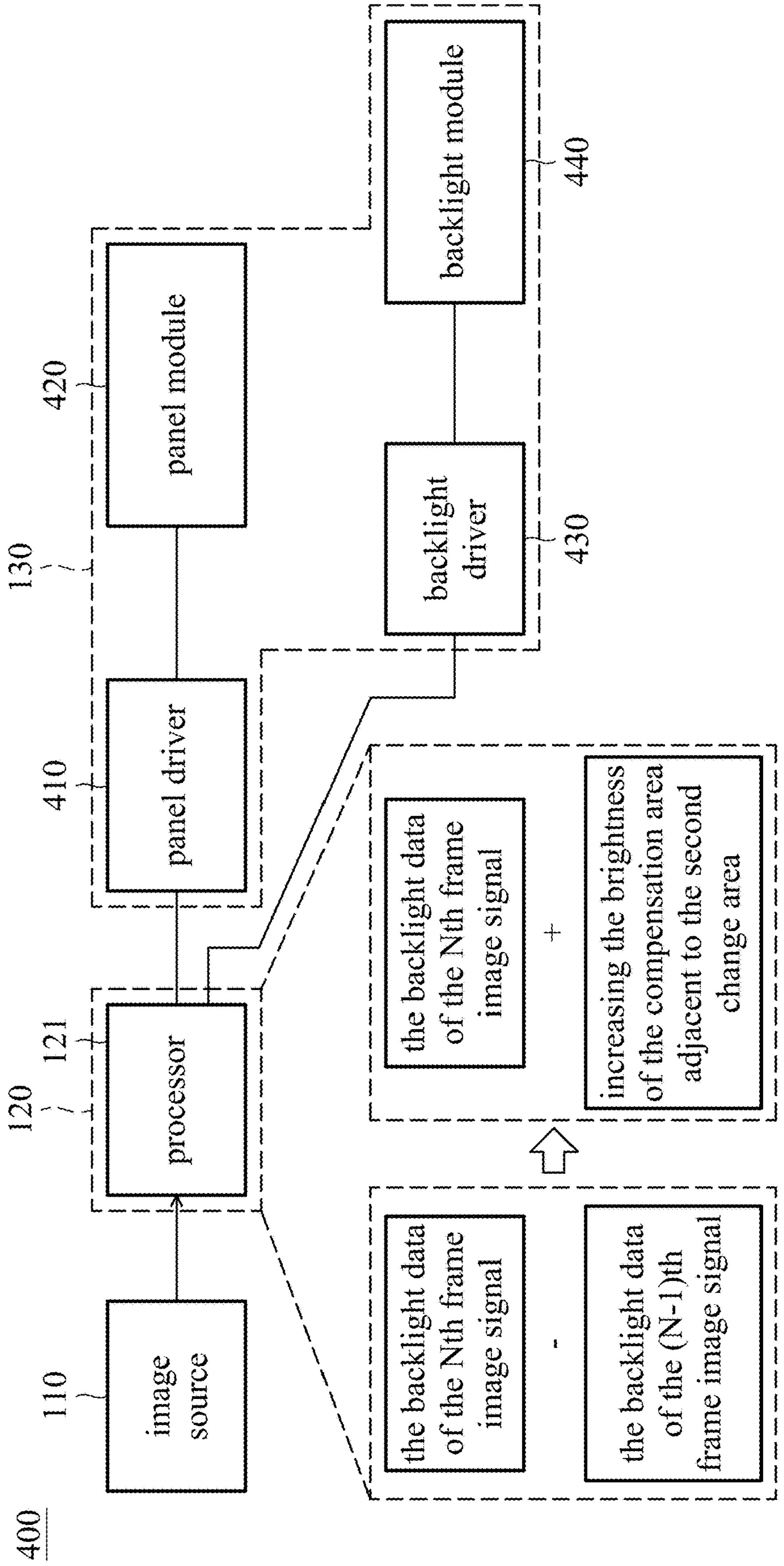
FIG. 4 is a schematic view of a display device according to an embodiment of the disclosure.

FIG. 4 is a schematic view of a display device according to an embodiment of the disclosure. Please refer to FIG. 4. The display device 400 may at least include an image source 110, a timing controller 120 and a display 130. In the embodiment, the image source 110 in FIG. 4 is the same as or similar to the image source 110 in FIG. 1. Accordingly, the image source 110 in FIG. 4 may refer to the description of the embodiment of FIG. 1, and the description thereof is not repeated herein.

When the processor 121 of the timing controller 120 receives the (N−1)th frame image signal and the Nth frame image signal, the processor 121 may capture the image data and the backlight data of the (N−1)th frame image signal and the image data and the backlight data of the Nth frame image signal, output the image data of the Nth frame image signal, analyze the change area between the backlight data of the (N−1)th frame image signal and the backlight data of the Nth frame image signal, and generate an image command. In the embodiment, the operation of the processor 121 in FIG. 4 analyzing the change area and generating the image command is the same as or similar to the operation of the processor 121 in FIG. 1. Accordingly, the operation of the processor 121 in FIG. 4 may refer to the description of the embodiments of FIG. 1, FIG. 2A to FIG. 2B and FIG. 3A to FIG. 3B, and the description thereof is not repeated herein.

The display 130 may display the corresponding image and backlight brightness according to the image data and the backlight data of the Nth frame image signal and the brightness signal of the compensation area adjacent to the second change area. In addition, the display 130 may include a panel driver 410, a panel module 420, a backlight driver 430 and a backlight module 440. The panel driver 410 may be electrically connected to the timing controller 120 (the processor 121), and may receive the image data of the Nth frame image signal to generate a panel driving signal. The panel module 420 may be electrically connected to the panel driver 410, and may receive the panel driving signal to display the image corresponding to the Nth frame image signal. In some embodiments, the panel module 420 may include a liquid crystal display (LCD) panel, but the disclosure is not limited thereto.

The backlight driver 430 may be electrically connected to the timing controller 120 (the processor 121), and may receive the image command (for example, including the backlight data of the Nth frame image signal and the brightness signal of the compensation area adjacent to the second change area) to generate a backlight driving signal. The backlight module 440 may be electrically connected to the backlight driver 430, and may receive the backlight driving signal to display the backlight data corresponding to the Nth frame image signal and the backlight brightness of the brightness signal of the compensation area adjacent to the second change area. In some embodiments, the backlight module 440 may include a light emitting diode (LED) backlight source or another suitable backlight source, but the disclosure is not limited thereto. Therefore, it may effectively increase the halo size of the dynamic object to compensate for the stability and speed of the brightness of the dynamic object, or decrease the halo size of the static object.

Figure 5:
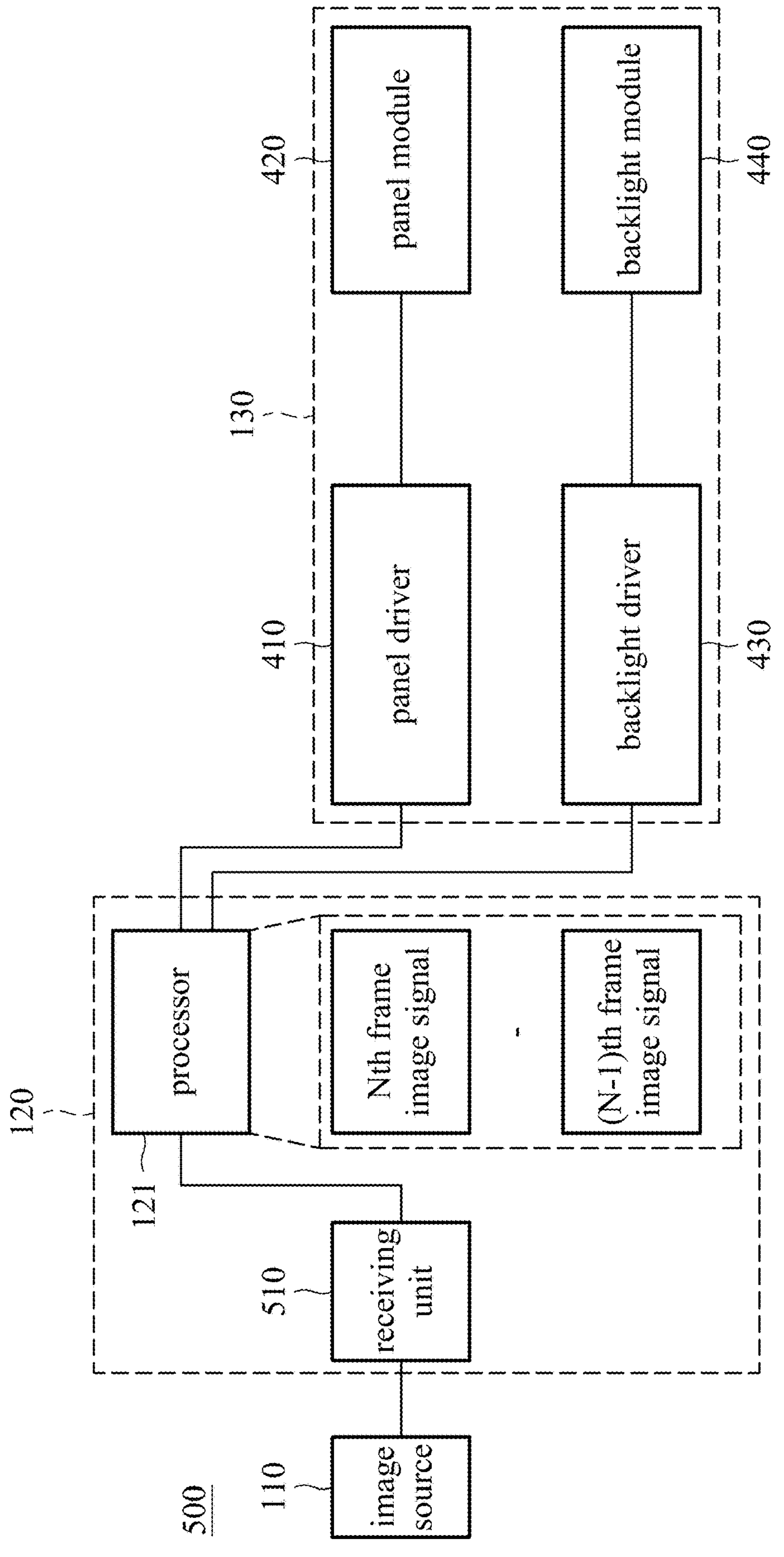
FIG. 5 is a schematic view of a display device according to an embodiment of the disclosure.

FIG. 5 is a schematic view of a display device according to an embodiment of the disclosure. Please refer to FIG. 5. The display device 500 may at least include an image source 110, a timing controller 120 and a display 130. In the embodiment, the image source 110 in FIG. 5 is the same as or similar to the image source 110 in FIG. 1. Accordingly, the image source 110 in FIG. 5 may refer to the description of the embodiment of FIG. 1, and the description thereof is not repeated herein.

The timing controller 120 may include a receiving unit 510 and a processor 121. The receiving unit 510 may electrically connected to the image source 110, and may receive and output the initial image provided by the image source. The processor 121 may electrically connected to the receiving unit 510, and may receive the initial image through the receiving unit 510.

When the processor 121 receives the (N−1)th frame image signal and the Nth frame image signal of the initial image, the processor 121 may first analyze the change area between the (N−1)th frame image signal and the Nth frame image signal. For example, the processor 121 subtracts the Nth frame image signal and the (N−1)th frame image signal to obtain the change area between the (N−1)th frame image signal and the Nth frame image signal. Then, the processor 121 may capture the image data and the backlight data of the (N−1)th frame image signal and the image data and the backlight data of the Nth frame image signal.

Afterward, the processor 121 may output the image data of the Nth frame image signal, and generate the image command according to the change area between the (N−1)th frame image signal and the Nth frame image signal. In the embodiment, the operation of the processor 121 in FIG. 5 analyzing the change area and generating the image command is the same as or similar to the operation of the processor 121 in FIG. 1. Accordingly, the operation of the processor 121 in FIG. 5 may refer to the description of the embodiments of FIG. 1, FIG. 2A to FIG. 2B and FIG. 3A to FIG. 3B, and the description thereof is not repeated herein.

The display 130 may display the corresponding image and backlight brightness according to the image data and the backlight data of the Nth frame image signal and the brightness signal of the compensation area adjacent to the second change area. In addition, the display 130 may include a panel driver 410, a panel module 420, a backlight driver 430 and a backlight module 440. In the embodiment, the panel driver 410, the panel module 420, the backlight driver 430 and the backlight module 440 in FIG. 5 are the same as or similar to the panel driver 410, the panel module 420, the backlight driver 430 and the backlight module 440 in FIG. 4. Accordingly, the panel driver 410, the panel module 420, the backlight driver 430 and the backlight module 440 in FIG. 5 may refer to the description of the embodiment of FIG. 4, but the disclosure is not limited thereto. Therefore, it may effectively increase the halo size of the dynamic object to compensate for the stability and speed of the brightness of the dynamic object, or decrease the halo size of the static object.

Figure 6:
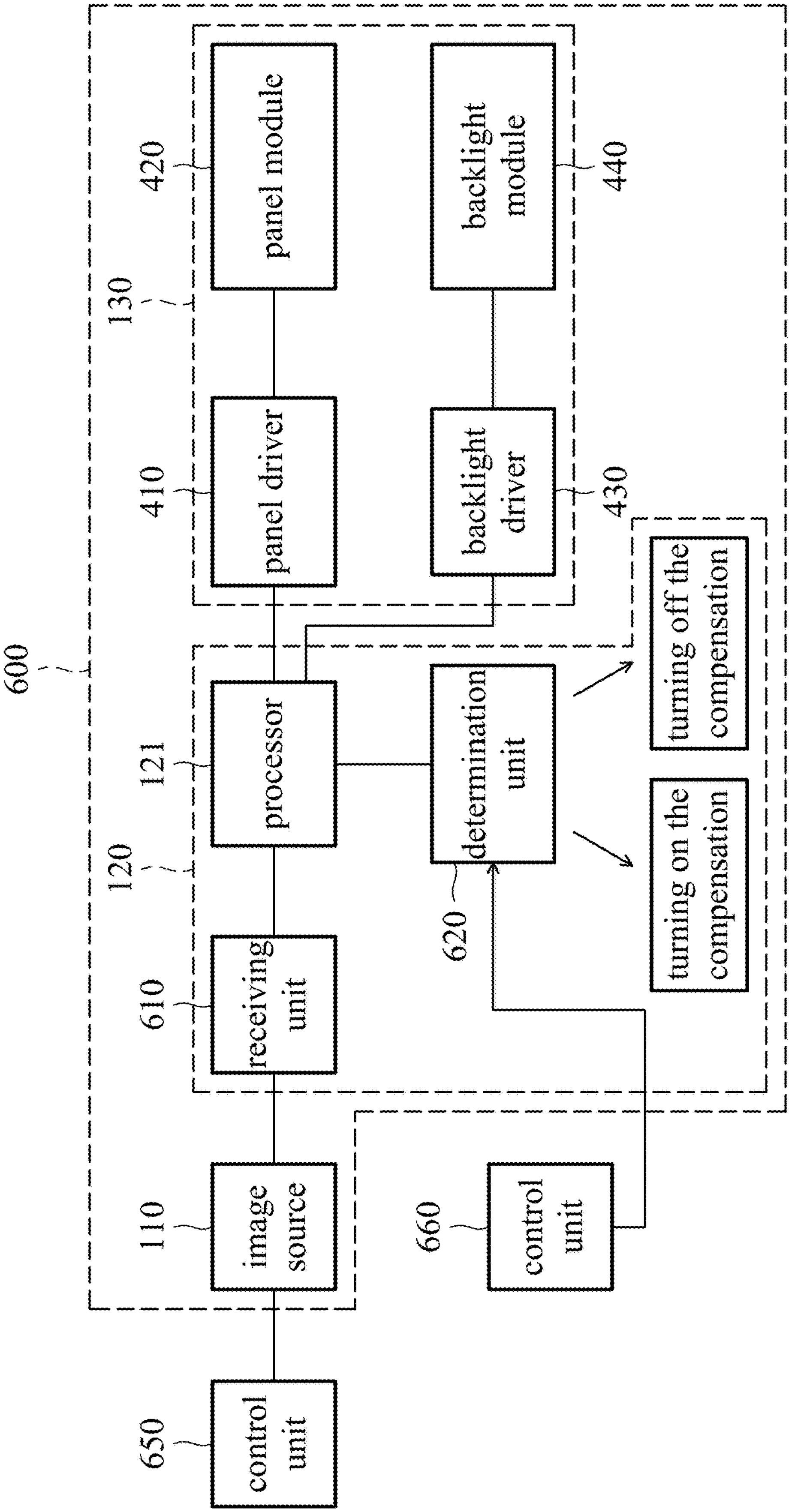
FIG. 6 is a schematic view of a display device according to an embodiment of the disclosure.

FIG. 6 is a schematic view of a display device according to an embodiment of the disclosure. In the embodiment, the display device 600 may be electrically connected to a control unit 650 and a control unit 660. In some embodiments, the control unit 650 may be a vehicle control unit (VCU), and the control unit 660 may be a vehicle control unit or a micro control unit, but the disclosure is not limited thereto. In some embodiments, the control unit 650 and the control unit 660 may be integrated into a control unit, such as a vehicle control unit or a micro control unit, and the same effect may also be achieved.

Figure 7B:
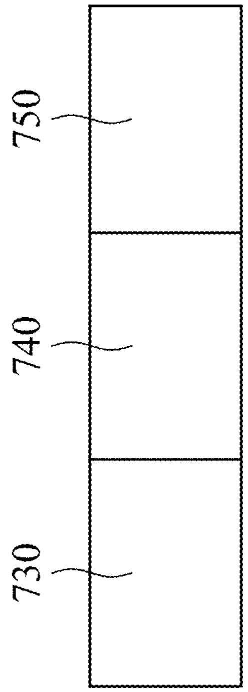
FIG. 7B is a schematic view of an initial image according to an embodiment of the disclosure.
Figure 7A:
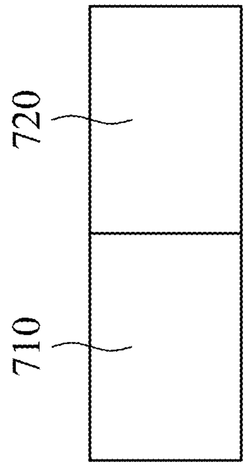
FIG. 7A is a schematic view of an initial image according to an embodiment of the disclosure.

Please refer to FIG. 6. The display device 600 may at least include an image source 110, a timing controller 120 and a display 130. The image source 110 may be electrically connected to the control unit 650, and the image source 110 is controlled by the control unit 650 to provide the corresponding initial image. In addition, the initial image of the embodiment may be divided into at least a first area 710 and a second area 720, as shown in FIG. 7A. In some embodiments, the above first area 710 is different from the above second area 720. For example, the above first area 710 may be a static image area (for example, the display information may not change during use or may not change during most of the use time), and the above second area 720 may be a dynamic image area (for example, the display information may change during use), but the disclosure is not limited thereto. In the embodiment, the image source 110 in FIG. 6 is the same as or similar to the image source 110 in FIG. 1. Accordingly, the image source 110 in FIG. 6 may refer to the description of the embodiment of FIG. 1, and the description thereof is not repeated herein.

The timing controller 120 may include a receiving unit 610, an area determination unit 620 and a processor 121. The receiving unit 610 may be electrically connected to the image source 110, and may receive and output the initial image provided by the image source 110. The area determination unit 620 may be electrically connected to the control unit 660. The area determination unit 620 is controlled by the control unit 660, so as to determine the states of the first area and the second area of the initial image, and generate a first determination signal corresponding to the first area and the second determination signal corresponding to the second area. In addition, the first determination signal and the second determination signal may be used to instruct the processor 121 to determinate whether to turn on the compensation or turn off the compensation.

The processor 121 may be electrically connected to the receiving unit 610 and the area determination unit 620. The processor 121 may receive the initial image through the receiving unit 610. The processor 121 may receive the first determination signal and the second determination signal, and determinate whether to turn on the compensation or turn off the compensation.

For example, when the first determination signal indicates that the first area 710 is the static image area, the processor 121 may turn off the compensation for the first area 710, and the processor 121 may not perform the operation of analyzing the (N−1)th frame image signal and the Nth frame image signal of the initial image and generating the image command on the first area 710, and may output the image data and backlight data of the Nth frame image signal in the first area 710 to the display 130. When the second determination signal indicates that the second area 720 is the dynamic image area, the processor 121 may turn on the compensation for the second area 720, and the processor 121 may perform the operation of analyzing the change area between the (N−1)th frame image signal and the Nth frame image signal and generating the image command on the second area 720.

In the embodiment, the operation of the processor 121 in FIG. 6 analyzing the change area and generating the image command is the same as or similar to the operation of the processor 121 in FIG. 1. Accordingly, the operation of the processor 121 in FIG. 6 may refer to the description of the embodiments of FIG. 1, FIG. 2A to FIG. 2B and FIG. 3A to FIG. 3B, and the description thereof is not repeated herein. Therefore, the processor 121 of the embodiment may not perform the calculation of the change area on each of the areas of the initial image, which may decrease the calculation amount of the processor 121, or decrease the power consumption of the display device 600.

The display 130 may receive the Nth frame image signal in the first area and the second area and the brightness signal of the compensation area adjacent to the second change area in the second area, so as to display the corresponding image and backlight brightness. In addition, the display 130 may include a panel driver 410, a panel module 420, a backlight driver 430 and a backlight module 440. In the embodiment, the panel driver 410, the panel module 420, the backlight driver 430 and the backlight module 440 in FIG. 6 are the same as or similar to the panel driver 410, the panel module 420, the backlight driver 430 and the backlight module 440 in FIG. 4. Accordingly, the panel driver 410, the panel module 420, the backlight driver 430 and the backlight module 440 in FIG. 6 may refer to the description of the embodiment of FIG. 4, but the disclosure is not limited thereto. Therefore, it may effectively increase the halo size of the dynamic object to compensate for the stability and speed of the brightness of the dynamic object, or decrease the halo size of the static object.

In some embodiments, the display device 600 may include a power saving mode, a premium display mode, or a partition selection mode. For example, as shown in FIG. 7B, the initial image may be divided into a first area 730, a second area 740 and a third area 750, wherein the first area 730 may correspond to the instrument panel area of the display 130, the second area 740 may correspond to the central control area of the display 130, and the third area 750 may correspond to the front passenger seat of the display 130, but the disclosure is not limited thereto.

When the display device 600 is set to the power saving mode, the processor 121 (the timing controller 120) may perform the operation of analyzing the change area between the (N−1)th frame image signal and the Nth frame image signal and generating the image command on first area 730. In addition, the processor 121 may not perform the operation of analyzing the change area between the (N−1)th frame image signal and the Nth frame image signal and generating the image command on the second area 740 and the third area, and may output the image data and the backlight data of the Nth frame image signal in the second area 740 and the third area 750 to the display 130. Therefore, it may effectively decrease the power consumption of the display device 600.

When the display device 600 is set to the premium display mode, the processor 121 (the timing controller 120) may perform the operation of analyzing the change area between the (N−1)th frame image signal and the Nth frame image signal and generating the image command on first area 730, the second area 740 and the third area 750. That is, the display device 600 may perform the operation of analyzing the change area on each of the areas (i.e., the first area 730, the second area 740 and the third area 750) of the initial image. Therefore, it may increase the quality of the image displayed by the display device 600.

When the display device 600 is set to the partition selection mode, the processor 121 (the timing controller 120) may perform the operation of analyzing the change area between the (N−1)th frame image signal and the Nth frame image signal and generating the image command on at least one of the first area 730, the second area 740 and the third area 750. Therefore, the user may select the area of the dynamic compensation, so as to increase the convenience of use.

Figure 8:
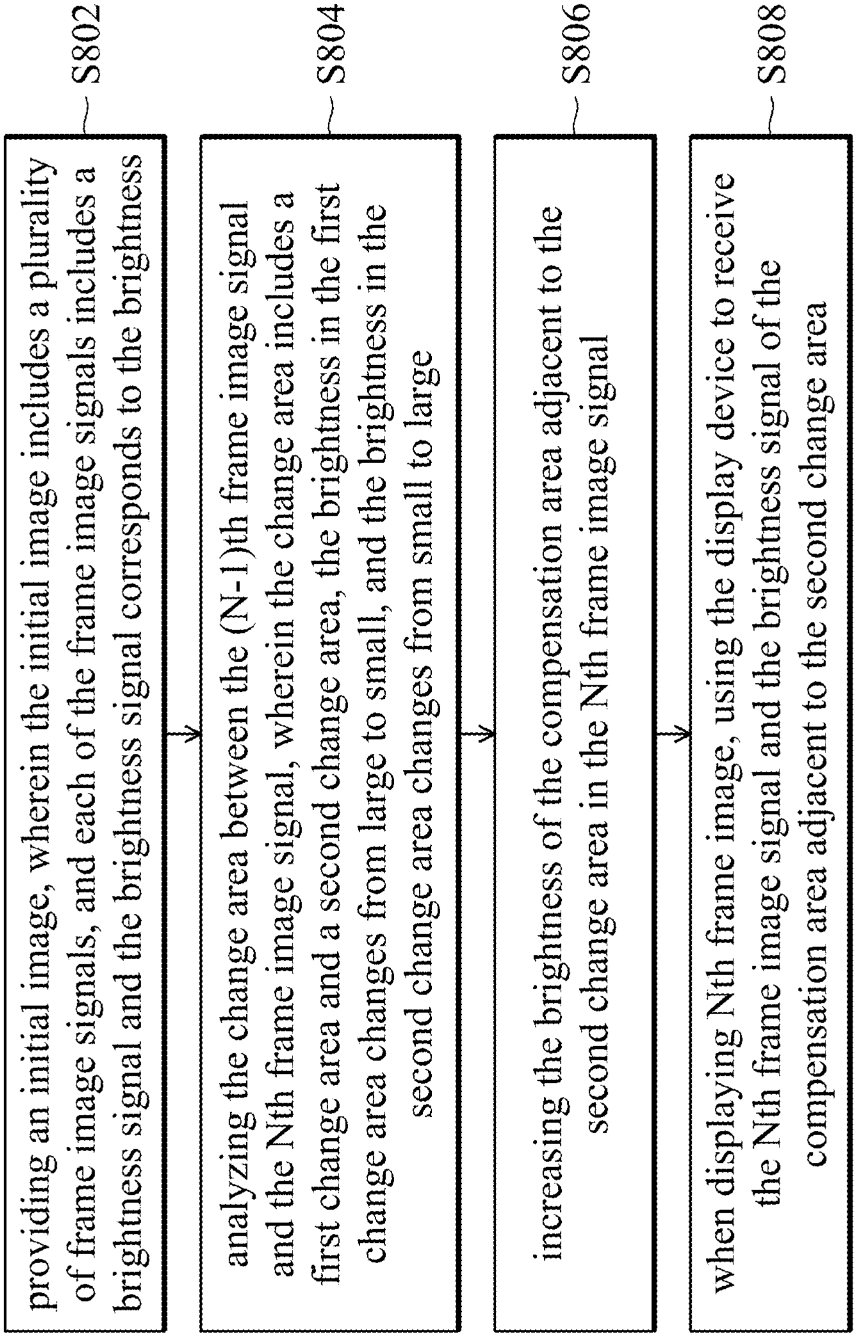
FIG. 8 is a flowchart of a method for displaying an image by a display device according to an embodiment of the disclosure.

FIG. 8 is a flowchart of a method for displaying an image by a display device according to an embodiment of the disclosure. The flowchart of the embodiment may correspond to the display device 100 in FIG. 1. In step S802, the method involves providing an initial image, wherein the initial image includes a plurality of frame image signals, and each of the frame image signals includes a brightness signal and the brightness signal corresponds to the brightness. In step S804, the method involves analyzing the change area between the (N−1)th frame image signal and the Nth frame image signal, wherein the change area includes a first change area and a second change area, the brightness in the first change area changes from large to small, and the brightness in the second change area changes from small to large. In step S806, the method involves increasing the brightness of the compensation area adjacent to the second change area in the Nth frame image signal. In step S808, the method involves when displaying Nth frame image, using the display device to receive the Nth frame image signal and the brightness signal of the compensation area adjacent to the second change area.

Figure 9:
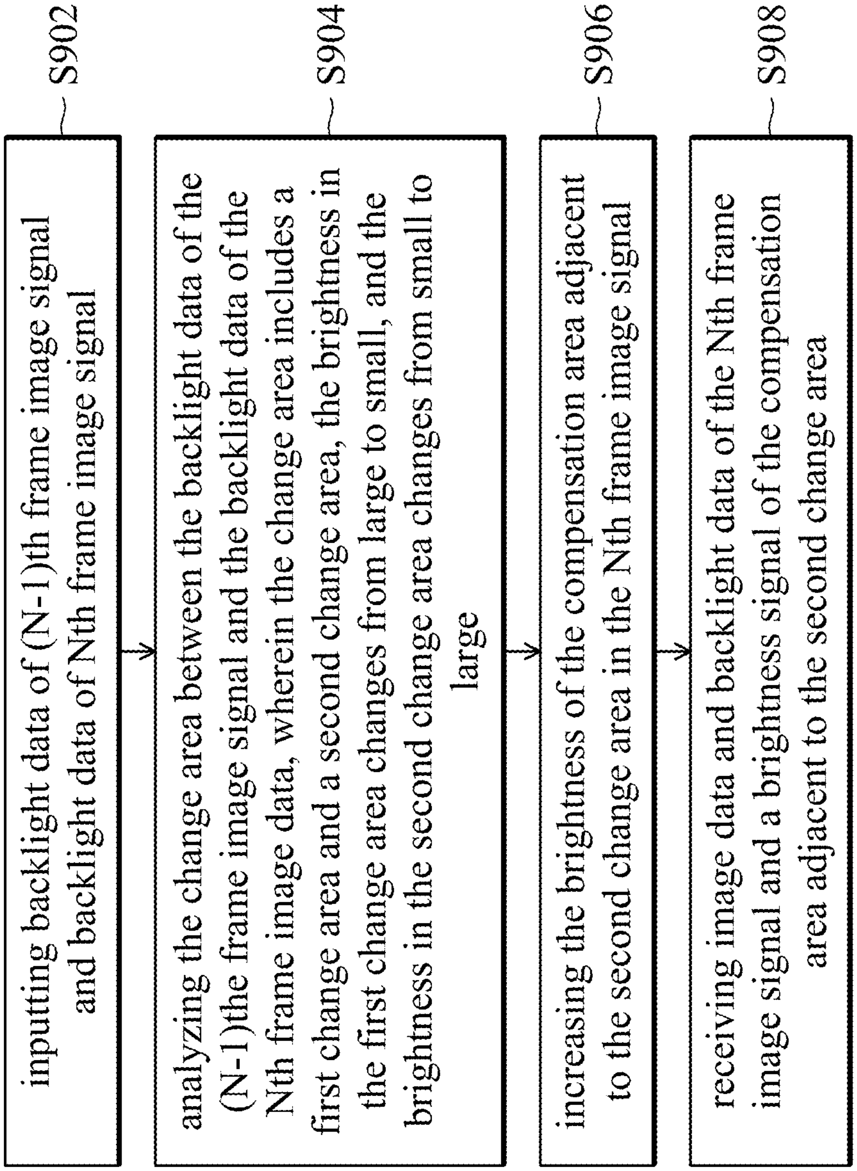
FIG. 9 is a flowchart of a method for displaying an image by a display device according to an embodiment of the disclosure.

FIG. 9 is a flowchart of a method for displaying an image by a display device according to an embodiment of the disclosure. The flowchart of the embodiment may correspond to the display device 400 in FIG. 4. In step S902, the method involves inputting backlight data of (N−1)th frame image signal and backlight data of Nth frame image signal. In step S904, the method involves analyzing the change area between the backlight data of the (N−1) the frame image signal and the backlight data of the Nth frame image data, wherein the change area includes a first change area and a second change area, the brightness in the first change area changes from large to small, and the brightness in the second change area changes from small to large. In step S906, the method involves increasing the brightness of the compensation area adjacent to the second change area in the Nth frame image signal. In step S908, the method involves receiving image data and backlight data of the Nth frame image signal and a brightness signal of the compensation area adjacent to the second change area.

Figure 10:
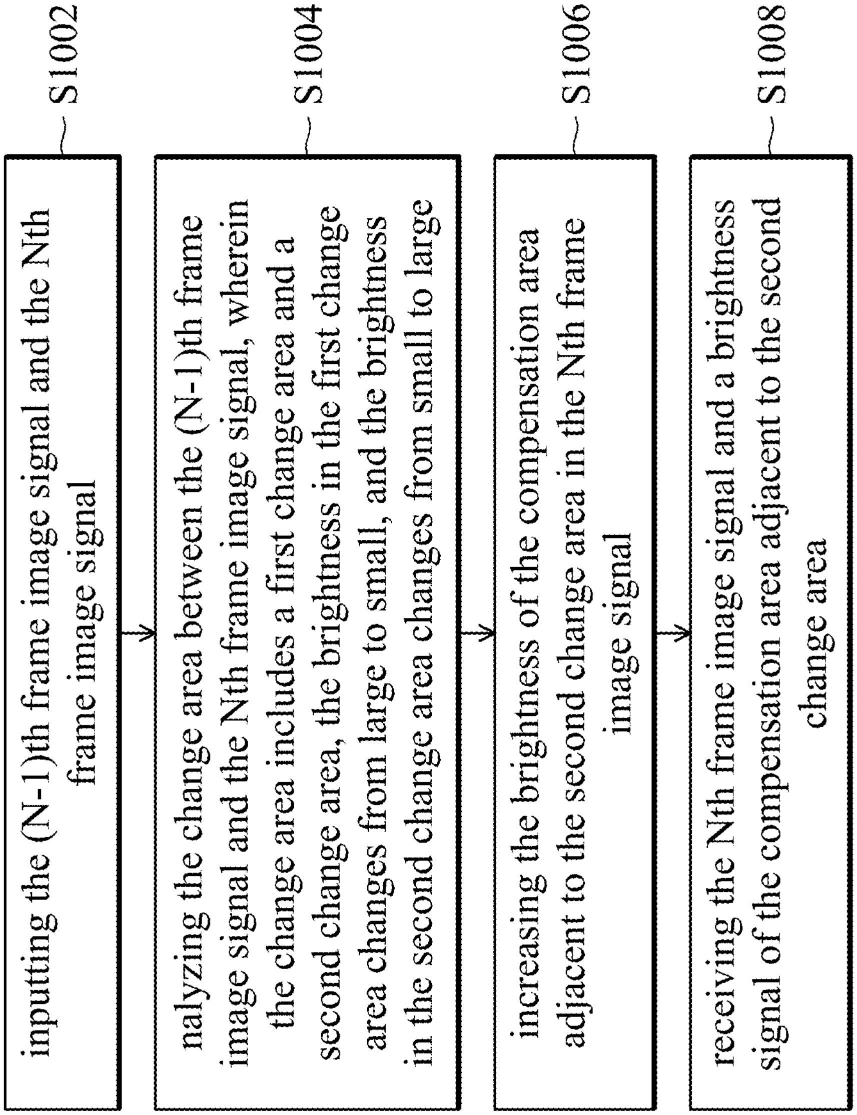
FIG. 10 is a flowchart of a method for displaying an image by a display device according to an embodiment of the disclosure.

FIG. 10 is a flowchart of a method for displaying an image by a display device according to an embodiment of the disclosure. In step S1002, the method involves inputting the (N−1)th frame image signal and the Nth frame image signal. In step S1004, the method involves analyzing the change area between the (N−1)th frame image signal and the Nth frame image signal, wherein the change area includes a first change area and a second change area, the brightness in the first change area changes from large to small, and the brightness in the second change area changes from small to large. In step S1006, the method involves increasing the brightness of the compensation area adjacent to the second change area in the Nth frame image signal. In step S1008, the method involves receiving the Nth frame image signal and a brightness signal of the compensation area adjacent to the second change area.

Figure 11:
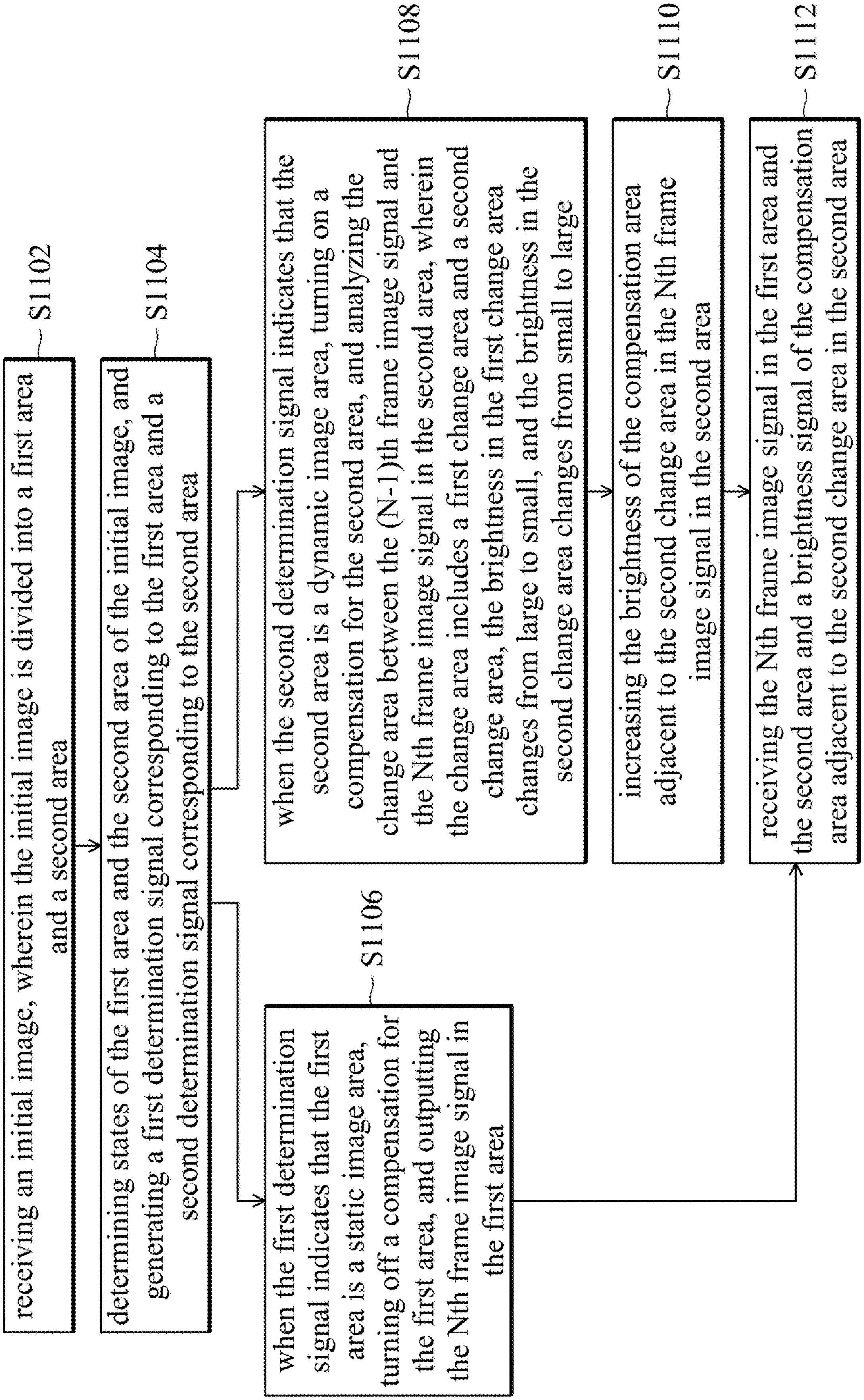
FIG. 11 is a flowchart of a method for displaying an image by a display device according to an embodiment of the disclosure.

FIG. 11 is a flowchart of a method for displaying an image by a display device according to an embodiment of the disclosure. In step S1102, the method involves receiving an initial image, wherein the initial image is divided into a first area and a second area. In step S1104, the method involves determining states of the first area and the second area of the initial image, and generating a first determination signal corresponding to the first area and a second determination signal corresponding to the second area. In step S1106, the method involves when the first determination signal indicates that the first area is a static image area, turning off a compensation for the first area, and outputting the Nth frame image signal in the first area.

In step S1108, the method involves when the second determination signal indicates that the second area is a dynamic image area, turning on a compensation for the second area, and analyzing the change area between the (N−1)th frame image signal and the Nth frame image signal in the second area, wherein the change area includes a first change area and a second change area, the brightness in the first change area changes from large to small, and the brightness in the second change area changes from small to large. In step S1110, the method involves increasing the brightness of the compensation area adjacent to the second change area in the Nth frame image signal in the second area. In step S1112, the method involves receiving the Nth frame image signal in the first area and the second area and a brightness signal of the compensation area adjacent to the second change area in the second area.

In summary, according to the display device and the method for displaying the image using the display device disclosed by the embodiments of the disclosure, the change area between the (N−1)th frame image signal and the Nth frame image signal of the initial image, wherein the change area includes the first change area and the second change area, the brightness in the first change area changes from large to small, and the brightness in the second change area changes from small to large. The brightness of the compensation area adjacent to the second change area in the Nth frame image signal is increased. When displaying the Nth frame image, the display device receives the Nth frame image signal and the brightness signal of the compensation area adjacent to the second change area. Therefore, it may effectively increase the halo size of the dynamic object to compensate for the stability and speed of the brightness of the dynamic object, or decrease the halo size of the static object.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. A method for displaying an image using a display device, comprising:

providing an initial image, wherein the initial image comprises a plurality of frame image signals, and each of the plurality of frame image signals comprises a brightness signal and the brightness signal corresponds to brightness;

analyzing a change area between an (N−1)th frame image signal and an Nth frame image signal, wherein the change area comprises a first change area and a second change area, the brightness in the first change area changes from large to small, and the brightness in the second change area changes from small to large;

increasing brightness of a compensation area adjacent to the second change area in the Nth frame image signal;

when displaying Nth frame image, using the display device to receive the Nth frame image signal and the brightness signal of the compensation area adjacent to the second change area.

2. The method for displaying the image using the display device as claimed in claim 1, wherein the compensation area adjacent to the second change area comprises a first compensation area and a second compensation area, and the first compensation area is located between the second change area and the second compensation area.

3. The method for displaying the image using the display device as claimed in claim 2, wherein the brightness of the second compensation area is smaller than the brightness of the first compensation area.

4. The method for displaying the image using the display device as claimed in claim 2, wherein the brightness of the first compensation area is smaller than or equal to the brightness of the second change area.

5. The method for displaying the image using the display device as claimed in claim 1, wherein the brightness of the compensation area is smaller than or equal to the brightness of the second change area.

6. The method for displaying the image using the display device as claimed in claim 1, wherein the initial image is divided into a first area and a second area, the first area is a static image area, and the second area is a dynamic image area.

7. The method for displaying the image using the display device as claimed in claim 6, wherein the step of analyzing the change area between the (N−1)th frame image signal and the Nth frame image signal comprises:

analyzing the change area between the (N−1)th frame image signal and the Nth frame image signal in the second area.

8. The method for displaying the image using the display device as claimed in claim 7, wherein the step of increasing the brightness of the compensation area adjacent to the second change area in the Nth frame image signal comprises:

increasing the brightness of the compensation area adjacent to the second change area in the Nth frame image signal in the second area.

9. The method for displaying the image using the display device as claimed in claim 8, wherein the step of using the display device to receive the Nth frame image signal and the brightness signal of the compensation area adjacent to the second change area comprises:

using the display device to receive the Nth frame image signal in the first area and the second area and the brightness signal of the compensation area adjacent to the second change area in the second area.

10. A display device, comprising:

an image source, configured to provide an initial image, wherein the initial image comprises a plurality of frame image signals, and each of the plurality of frame image signals comprises a brightness signal and the brightness signal corresponds to brightness;

a timing controller, electrically connected to the image source and comprising a processor, wherein the processor is configured to analyze a change area between an (N−1)th frame image signal and an Nth frame image signal, and generate an image command; and a display, electrically connected to the timing controller, and configured to receive the image command;

wherein the change area between the (N−1)th frame image signal and the Nth frame image signal comprises a first change area and a second change area, the brightness in the first change area changes from large to small, and the brightness in the second change area changes from small to large;

wherein the display is configured to increase brightness of a compensation area adjacent to the second change area in the Nth frame image signal;

wherein when displaying Nth frame image, the display device is configured to receive the Nth frame image signal and the brightness signal of the compensation area adjacent to the second change area.

11. The display device as claimed in claim 10, wherein the compensation area adjacent to the second change area comprises a first compensation area and a second compensation area, and the first compensation area is located between the second change area and the second compensation area.

12. The display device as claimed in claim 11, wherein the brightness of the second compensation area is smaller than the brightness of the first compensation area.

13. The display device as claimed in claim 11, wherein the brightness of the first compensation area is smaller than or equal to the brightness of the second change area.

14. The display device as claimed in claim 10, wherein the brightness of the compensation area is smaller than or equal to the brightness of the second change area.

15. The display device as claimed in claim 10, wherein the initial image is divided into a first area and a second area, the first area is a static image area, and the second area is a dynamic image area.

16. The display device as claimed in claim 12, wherein the processor is further configured to analyze the change area between the (N−1)th frame image signal and the Nth frame image signal in the second area.

17. The display device as claimed in claim 16, wherein the display is further configured to increase the brightness of the compensation area adjacent to the second change area in the Nth frame image signal in the second area.

18. The display device as claimed in claim 17, wherein the display device is further configured to receive the Nth frame image signal in the first area and the second area and the brightness signal of the compensation area adjacent to the second change area in the second area.

19. The display device as claimed in claim 15, wherein the timing controller further comprises a determination unit, wherein the determination unit is configured to determine the states of the first area and the second area of the initial image, and to generate a first determination signal corresponding to the first area and the second determination signal corresponding to the second area.

20. The display device as claimed in claim 10, wherein the display comprises a backlight module and a panel module, wherein the timing controller is configured to provide the image command to the backlight module.

* * * * *